US008156654B2

(12) United States Patent
Reed et al.

(10) Patent No.: US 8,156,654 B2
(45) Date of Patent: Apr. 17, 2012

(54) CHAIN SAW ATTACHMENT FOR UNOBSTRUCTED BRUSH CUTTING

(76) Inventors: Thomas B. Reed, Barre, MA (US); Shivayam Ellis, Denver, CO (US)

( * ) Notice: Subject to any disclaimer, the term of this patent is extended or adjusted under 35 U.S.C. 154(b) by 2 days.

(21) Appl. No.: 12/685,082

(22) Filed: Jan. 11, 2010

(65) Prior Publication Data

US 2011/0167649 A1 Jul. 14, 2011

(51) Int. Cl.
*B27B 17/00* (2006.01)
*B23D 59/00* (2006.01)

(52) U.S. Cl. ................................ 30/371; 30/381; 30/382

(58) Field of Classification Search ..................... D8/70; 30/371, 374, 381–387
See application file for complete search history.

(56) References Cited

U.S. PATENT DOCUMENTS 2,143,757 A * 1/1939 Brazeale ........................ 30/371
2,532,982 A * 12/1950 De Young ........................ 30/371
2,567,886 A * 9/1951 Mall et al. ........................ 30/371
2,642,901 A * 6/1953 Hayden ........................ 30/371
2,665,719 A * 1/1954 Pennanen ........................ 30/371
2,698,034 A * 12/1954 Jakku ........................ 30/371
2,708,953 A * 5/1955 Diehl ........................ 30/371
2,813,556 A * 11/1957 Woodworth ........................ 30/371
2,821,213 A * 1/1958 York ........................ 30/371
RE24,588 E * 1/1959 Budd ........................ 30/371
2,902,065 A * 9/1959 Graves et al. ........................ 30/371
2,925,105 A * 2/1960 Hayden ........................ 30/371
2,930,416 A * 3/1960 Granberg ........................ 30/371
3,051,203 A * 8/1962 Hayden ........................ 30/371
3,092,156 A * 6/1963 Hayden ........................ 30/371
3,540,500 A * 11/1970 Greene ........................ 30/382
3,680,607 A * 8/1972 Robinson ........................ 30/383
3,815,229 A * 6/1974 Granberg ........................ 30/124
4,142,292 A * 3/1979 Ulrich ........................ 30/371
4,143,460 A * 3/1979 Shean ........................ 30/371
4,270,272 A 6/1981 Graham
4,317,285 A 3/1982 Graham
4,534,111 A * 8/1985 Eistrat ........................ 30/371
4,726,118 A * 2/1988 Mattson et al. ........................ 30/371
4,888,872 A 12/1989 Eistrat
D323,773 S * 2/1992 Allen ........................ D8/70
5,123,168 A 6/1992 Lyons
5,150,524 A * 9/1992 Hall ........................ 30/382
5,239,758 A * 8/1993 Lindell ........................ 30/383
5,511,315 A 4/1996 Raya
5,560,111 A * 10/1996 Dofredo ........................ 30/371
5,669,145 A 9/1997 Skripsky
5,671,537 A * 9/1997 Dofredo ........................ 30/382
5,826,343 A * 10/1998 Mollberg, Jr. ........................ 30/371
5,878,499 A * 3/1999 King et al. ........................ 30/371
6,536,119 B1 * 3/2003 Carr ........................ 30/371
2007/0271798 A1 * 11/2007 Webb ........................ 30/371
2009/0133269 A1 * 5/2009 Hanaway ........................ 30/383
2009/0272462 A1 * 11/2009 Kauppila ........................ 30/383

* cited by examiner

*Primary Examiner* — Jason Daniel Prone
(74) *Attorney, Agent, or Firm* — Los Angeles Patent Group; Arman Katiraei

(57) ABSTRACT

The invention provides a chain saw attachment for unobstructed cutting of smaller objects with diameters less than three inches and larger objects with diameters greater than three inches. The attachment includes a set of prongs that vertically extend at an acute angle from a cover above the cutting teeth of the chain saw blade to a specified distance below the blade. The prongs stabilize small objects from whipping and dragging when engaged by the cutting teeth and facilitate the cutting of brush with diameter equal to height of the blade. Moreover, the cover does not extend the full length of the blade to allow for fully unobstructed cuts using the uncovered section of the blade. The cover increase safe operation of the chain saw and distributes stress from a particular prong over the entire attachment.

12 Claims, 8 Drawing Sheets

CHAIN SAW ATTACHMENT FOR UNOBSTRUCTED BRUSH CUTTING

TECHNICAL FIELD

The present invention relates to an attachment for a motorized cutting tool. More particularly, this invention relates to an attachment for a chain saw to safely and efficiently cut loose brush.

BACKGROUND ART

Chain saws are highly effective and portable motorized cutting tools. Chain saws include gasoline or electric powered motors that typically provide one to three kilowatts of power. This power is sufficient to cut through over 100 square inches of solid wood in a short period of time. As a result, chains saws are particularly effective in reducing tree trunks, large tree branches, or other large objects with diameters greater than three inches into easily transportable segments. These large objects are sufficiently dense and contain sufficient mass so as to remain stationary when being cut by the chain saw.

However, 20%-50% of the organic matter of every tree includes smaller objects with diameters less than three inches such as tree limbs, smaller tree branches, and twigs collectively referred to as "brush". Brush is much less dense than the larger segments of a tree. Typically, a large segment of a typical hardwood (e.g., deciduous) has a density of approximately 40 lb/cf$^3$ (pounds per cubic foot), a large segment of a typical softwood (e.g., coniferous) has a density of approximately 30 lb/cf$^3$, and when stacked as a cord of wood, the density is approximately 34 lb/cf$^3$ and 22 lb/cf$^3$ respectively, due to about 15% void space. A pile of brush has an approximate density of one to two lb/cf$^3$ depending on the species of wood, moisture content, irregular shape, and stacking of the brush pile.

The thinner, lighter, and less dense brush is susceptible to movement when engaged by the chain saw. Specifically, when the cutting teeth of the chain saw make contact with the brush, they drag or whip the smaller branches and twigs. This movement does not allow for effective cutting of the brush and may cause injury to the chain saw operator or others in the immediate area. As a result, chain saws are not currently used to cut brush.

Having an effective means to cut brush reduces the volume of the brush making it easier for transport. Additionally, cut brush can serve as a valuable fuel source. Rather than disposing of brush at a waste or dump where it biodegrades over time, brush can be burned in furnaces and stoves when cut to an appropriate length. Also, the cut segments may be used to produce biochar and other forms of charcoal.

It is therefore an objective of the present invention to provide a chain saw attachment to effectively cut brush and other small objects without obstructing the chain saw from cutting larger objects simultaneously. It is further an objective of the present invention to provide a chain saw attachment that converts brush into fuel of an appropriate length for burning in a furnace of stove and for producing biochar and other forms of charcoal.

SUMMARY OF THE INVENTION

Some embodiments provide an attachment for a motorized cutting tool to stabilize objects being cut by the tool that are less than three inches in diameter without obstructing the cutting tool's ability to cut objects larger than three inches in diameter. The attachment includes a cross-section member, several prongs (also referred to as tines), and two connection points.

The cross-section member of the attachment spans longitudinally over a blade of the cutting tool. In some embodiments, the cutting tool is an electric or gasoline powered chain saw. In some embodiments, the blade includes a chain with several cutting teeth that rotate over a bar extending from the engine housing of the chain saw. Several prongs extend vertically downward from the cross-section member to a specified distance below the blade. The extension of the prongs below the blade serves as a stop to prevent motion of branches and twigs and also as a stop preventing contact against the ground or other hard surface. Therefore, when reaching into a brush pile with little or no visibility, the extension of the prongs will guide the saw operator's downward motion into the pile, stopping the motion prior to the cutting teeth of the blade making contact with the ground or other surface.

The prongs extend vertically at an acute angle from the cross-section member. The prongs are angled away from the engine housing and are angled in an opposite direction to the rotation of the cutting teeth. When the cutting teeth of the cutting tool engage an object, the rotational movement of the teeth pushes the object against a prong. The angle of the prong guides the object upwards into the blade while stabilizing the object from further movement (i.e., dragging) down the blade past the prong. The stress encountered by the prong is transferred to the cross-section member.

The attachment includes two connection points for coupling the attachment to the blade of the cutting tool. When the attachment is secured at the connection points, the cross-section member is positioned above the cutting teeth rotating at the top of the blade. In some embodiments, the connection points are located along the vertical extension of two separate prongs. In some embodiments, the first and last prongs contain the connection points. In this configuration, the cross-section member covers the top of the blade up to the first prong and leaves a specified distance from the first prong to the end of the blade uncovered. The uncovered portion may be used to cut large objects (i.e., objects with diameters greater than 3 inches) without obstruction by the attachment. Additionally, the uncovered portion may be used to perform kerf or groove cuts without obstruction by the attachment.

In some embodiments, a first prong is horizontally separated from a second prong by the linear vertical distance between the top and the bottom of the blade. Since the cross-section member is positioned above the top of the blade, the separation between the prongs allows each of the prongs to facilitate the cutting of objects with a diameter up to the linear vertical distance between the top and bottom of the blade. In some embodiments, the linear vertical distance is within a range of two to four inches. Therefore, each prong stabilizes small objects less than three inches in diameter from whipping and dragging without obstructing the cutting tools ability to cut large objects greater than three inches in diameter. In some embodiments, the separation between prongs is sufficiently large to facilitate the cutting of objects up to four inches in diameter. Some examples of small objects include tree limbs, smaller tree branches, bushes, shrubs, hedges, and twigs commonly referred to as "brush".

In some embodiments, the attachment produces cut segments of small objects less than three inches in diameter for use as a fuel source to generate biochar and other forms of charcoal. Some embodiments define processes for converting the biomass into biochar and other forms of charcoal.

BRIEF DESCRIPTION OF THE DRAWINGS

In order to achieve a better understanding of the nature of the present invention a preferred embodiment of the motorized cutting tool attachment will now be described, by way of example only, with reference to the accompanying drawings in which.

DETAILED DESCRIPTION OF THE INVENTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
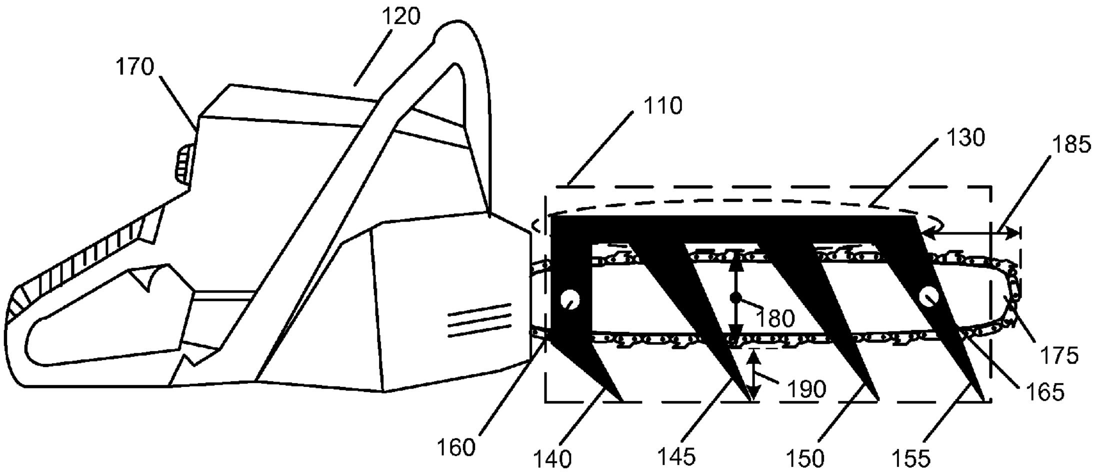
FIG. 1 illustrates an attachment for a motorized cutting tool in accordance with some embodiments of the invention.

FIG. 1 illustrates an attachment 110 for a motorized cutting tool 120 in accordance with some embodiments of the invention. The attachment 110 includes cross-section member 130, prongs 140, 145, 150, and 155 (also referred to as tines), and connection points 160 and 165. In some embodiments, the attachment 110 is made from a single piece of flat sheet metal. However, it should be apparent to one of ordinary skill in the art that the attachment 110 may be made from any rigid material (e.g., metal, aluminum, hardened plastic, etc.). In some embodiments, the attachment is 0.08 to 0.12 inches thick to provide the necessary stiffness to prevent bending when in use.

The motorized cutting tool 120 includes either an electric or gasoline powered motor 170 and a blade 175. The blade 175 is comprised of a chain with multiple cutting teeth that revolve around a bar extending horizontally from the body of the tool 120. The motor 170 powers the rotation of the cutting teeth around the bar. The motorized cutting tool 120 is depicted in FIG. 1 as a chain saw and will be referred to hereafter as a chain saw. However, it should be apparent to one of ordinary skill in the art that the motorized cutting tool 120 may include any motorized device with a rotating cutting blade. For example, the attachment 110 may be modified to couple to a rotary saw.

The cross-section member 130 of the attachment 110 spans horizontally over the cutting teeth of the blade 175. In some embodiments, the cross-section member 130 is raised by at least 0.25 inches over the cutting teeth. This separation permits both the top and bottom rows of cutting teeth to circulate beneath the cross-section member 130 without obstruction by the cross-section member 130. The chain saw 120 is thus free to cut objects with diameters equivalent to the vertical distance 180 between the cutting teeth at the top and bottom of the blade 175 in between the prongs of the attachment 110.

The cross-section member 130 extends from the first prong 155 to the last prong 140. The attachment 110 does not cover the top of the blade 175 for a distance of 185 at the front of the blade 175. In some embodiments, the distance 185 is four to eight inches. The open area at the front of the blade 185 may be used to perform fully unobstructed cuts with the attachment coupled to the blade 175. For example, the chain saw coupled with the attachment 110 may perform cuts in an upward motion, perform cuts when reaching for objects at a distance, and perform groove or kerf cuts to a depth equal to the length 185. Additionally, the open section 185 at the front of the blade 175 can be used to cut larger objects three inches or greater in diameter (e.g., five inches in diameter with a sixteen inch chain saw) in a conventional manner without removing or adjusting the attachment 110.

Each prong 140, 145, 150, and 155 extends vertically downward from the cross-section member 130 to a distance 190 below the cutting teeth at the bottom of the blade 175. In some embodiments, each prong extends two to four inches below the cutting teeth at the bottom of the blade 175. Each of the prongs 140-155 is acutely angled relative to the opposite rotation of the teeth of the cutting chain. In some embodiments, the acute angle of the prongs 140-155 is between 10 to 40 degrees.

In some embodiments, the prongs 140-155 are separated by a distance ranging from two to four inches. In some other embodiments, the attachment of some embodiments includes fewer prongs which allows for greater separation between the prongs (e.g., five to six inches). Chain saw blades often extend 16 inches beyond the motor housing, but can be shorter or longer. In some embodiments, the spacing and number of prongs is adjusted depending on the particular blade to which it is attached.

The prongs 140-155 facilitate the cutting of small objects with diameters less than three inches (e.g., tree limbs, smaller tree branches, bushes, shrubs, hedges, and twigs) and any object having a diameter up to and equal to the vertical distance between the top and bottom of the blade 175. The prongs 140-155 adapt the chain saw to safely cut small objects by stabilizing the small objects prior to being cut by the cutting teeth of the blade 175. Typically, when the cutting teeth of the blade 175 engage a small object, the force of the blade's rotation may accelerate and whip the small object without achieving a desired cut of the object. The prong positioned behind the small object restricts the motion of the small object without restricting the rotation of the cutting teeth. The prong prevents the object from obtaining sufficient acceleration to be whipped by the rotation of the cutting teeth. Furthermore, the angle of the prong produces a slope whereby objects engaged by the teeth are fed upwards into the blade by the lateral movement of the cutting teeth. This creates a self-feeding motion by which small objects are cut even with little or no downward force being applied by the chain saw operator.

The separation between the prongs 140-155 and the placement of the cross-section member 130 over the blade 175 provides the necessary clearance for the chain saw to cut any object with a diameter equal to the full height of the blade without having to remove or adjust the attachment 110. This is unlike other chain saw attachments that position the cross-section member across the middle of the blade. By positioning the cross-section member 130 of the attachment 110 over the top row of cutting teeth of the blade, the prongs 140-155 are able to stabilize and facilitate the cutting of brush that is twice the size in diameter.

The extension of the prongs below the lower portion of the blade 190 acts as a stop that prevents the cutting teeth from coming into contact with the ground or other hard surface. This allows the chain saw operator to reach into a brush pile without clear view of the ground clearance and safely make a series of cuts with the extension of the prongs acting to prevent contact with the ground or other hard surface.

Figure 2:
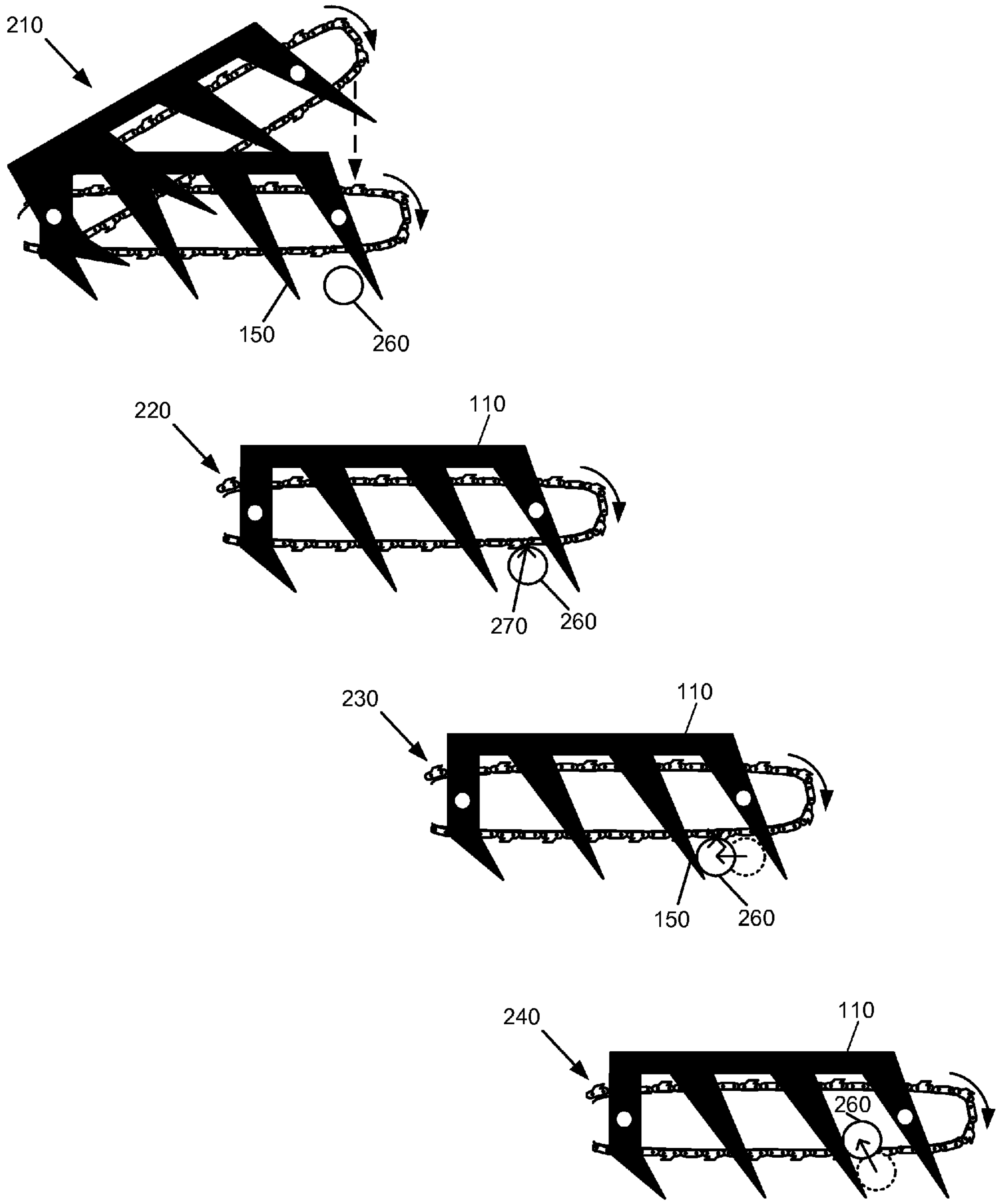
FIG. 2 conceptually illustrates how the prongs of the attachment facilitate the cutting of small objects in accordance with some embodiments.

FIG. 2 conceptually illustrates how the prongs of the attachment facilitate the cutting of small objects in accordance with some embodiments. FIG. 2 illustrates four stages of the cut 210, 220, 230, and 240. At 210 the chain saw is lowered over the object 260 so that prong 150 is positioned behind the object 260. At 220, the chain saw is lowered further so that the teeth of the blade engage the object 260 at contact point 270. The rotation of the teeth causes the object 260 to move horizontally until contact with prong 150 at 230. At 240, the angle of prong 150 combined with the rotation of the teeth forces the object 260 upwards into the blade causing the teeth to penetrate into the object 260 and thus creating the self-feeding motion that performs a cut of the object 260.

Referring back to FIG. 1, the attachment 110 is depicted with four prongs 140-155. Each prong may engage at least one object at any given instance. The multiple prongs allow the attachment 110 to engage multiple objects simultaneously. In so doing, the attachment 110 is quickly able to reduce the volume of a brush pile with fewer cutting motions of the chain saw. As an example, the attachment was successfully used to reduce a brush pile from approximately 2,000 cubic feet to 100 cubic feet in 30 minutes. It should be apparent to one of ordinary skill in the art that the attachment 110 may include additional or fewer prongs without impacting the functionality of the attachment 110.

The cross-section member 130 reinforces each of the prongs by distributing stresses from each prong over the entire attachment 110. By distributing stress from one prong over the entire attachment, the kickback resulting from the cutting chain engaging an object is dissipated from one contact point over the entire attachment 110.

Figure 3:
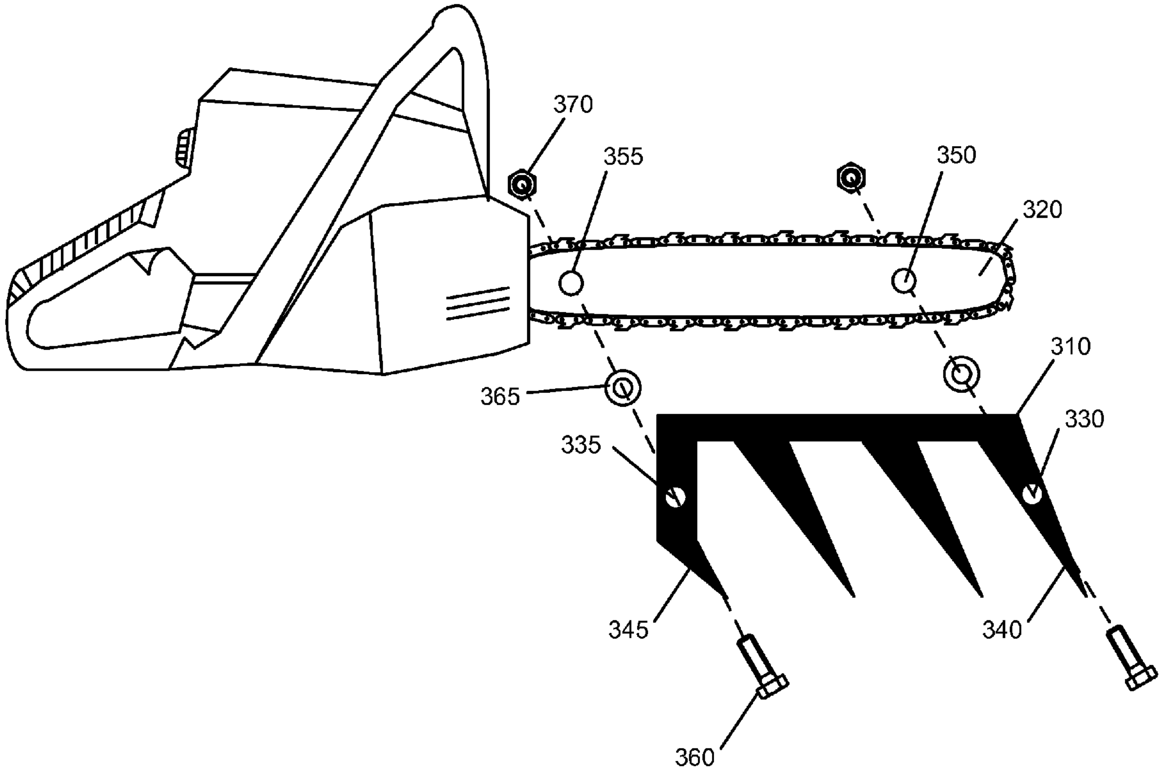
FIG. 3 provides an exploded view illustrating the coupling of the attachment to the chain saw bar in accordance with some embodiments.

The connection points 160 and 165 couple the attachment 110 to the chain saw bar of the blade 175. FIG. 3 provides an exploded view illustrating the coupling of the attachment 310 to the chain saw bar 320 in accordance with some embodiments. The attachment 310 includes two connection points 330 and 335. The connection points 330 and 335 are holes located on the first 340 and last 345 prongs of the attachment 310. The holes for the connection points 330 and 335 align with the mount openings 350 and 355 of the chain saw bar 320. In some embodiments, the connection points 330 and 335 are aligned with standard mount points of a variety of chain saw bars. In some other embodiments, the connection points 330 and 335 are aligned with non-standard mount points or the connection points 330 and 335 are located on prongs other than the first or last prongs of the attachment.

Bolt 360, washer 365, and nut 370 are used to securely fasten the attachment 310 to the chain saw bar 320. The body of the bolt 360 passes through connection point 335, washer 365, and mount point 355 of the chain saw bar 320. The hexagonal head of the bolt 360 is too large to pass through the connection point 355. Therefore, when the nut 370 secures the end of the bolt 360 on the other side of the chain saw bar 320, the attachment 310 is coupled to the chain saw bar 320.

The washer 365 provides clearance between the attachment 310 and the cutting teeth of the chain saw blade. Specifically, the washer 365 provides sufficient separation to allow for the prongs to extend vertically as near to the cutting teeth of the blade as is possible without contacting the cutting teeth. The close proximity between the prong extension and the cutting teeth reduces the possibility for objects to become lodged in between the prong and the blade. Furthermore, the close proximity reduces the whipping that may occur when small objects are pushed against the prong. The cutting teeth may flex from their stationary position during rotation or during cutting. Accordingly, the washer 365 provides sufficient separation to account for flexing of the cutting teeth. In some embodiments, the washer 365 provides 0.125 to 0.1875 inches of separation between the cutting teeth in their stationary position and the prongs of the attachment.

A second bolt, washer, and nut assembly is used to secure the attachment 310 at connection point 330 to mount point 350 of the chain saw bar 320. Additional washers may be used between the bolt head and the prong of the attachment or between the nut and the chain saw bar 320. These additional washers distribute stress from the tightened bolt across a larger area of the attachment 310 or the chain saw bar 320.

In some embodiments, wing nuts are used instead of traditional hexagonal nuts. Wing nuts allow an operator to attach and remove the chain saw attachment 310 without tools. It should be apparent to one of ordinary skill in the art that the attachment 310 may be secured to either side of the chain saw bar 320 (i.e., the right side or the left side). The chain saw operator's view of the blade is obstructed from one side of the blade. This allows the operator to freely align the blade of the chain saw from one side and also align the prongs of the attachment from the other side providing greater cutting precision.

Figure 4:
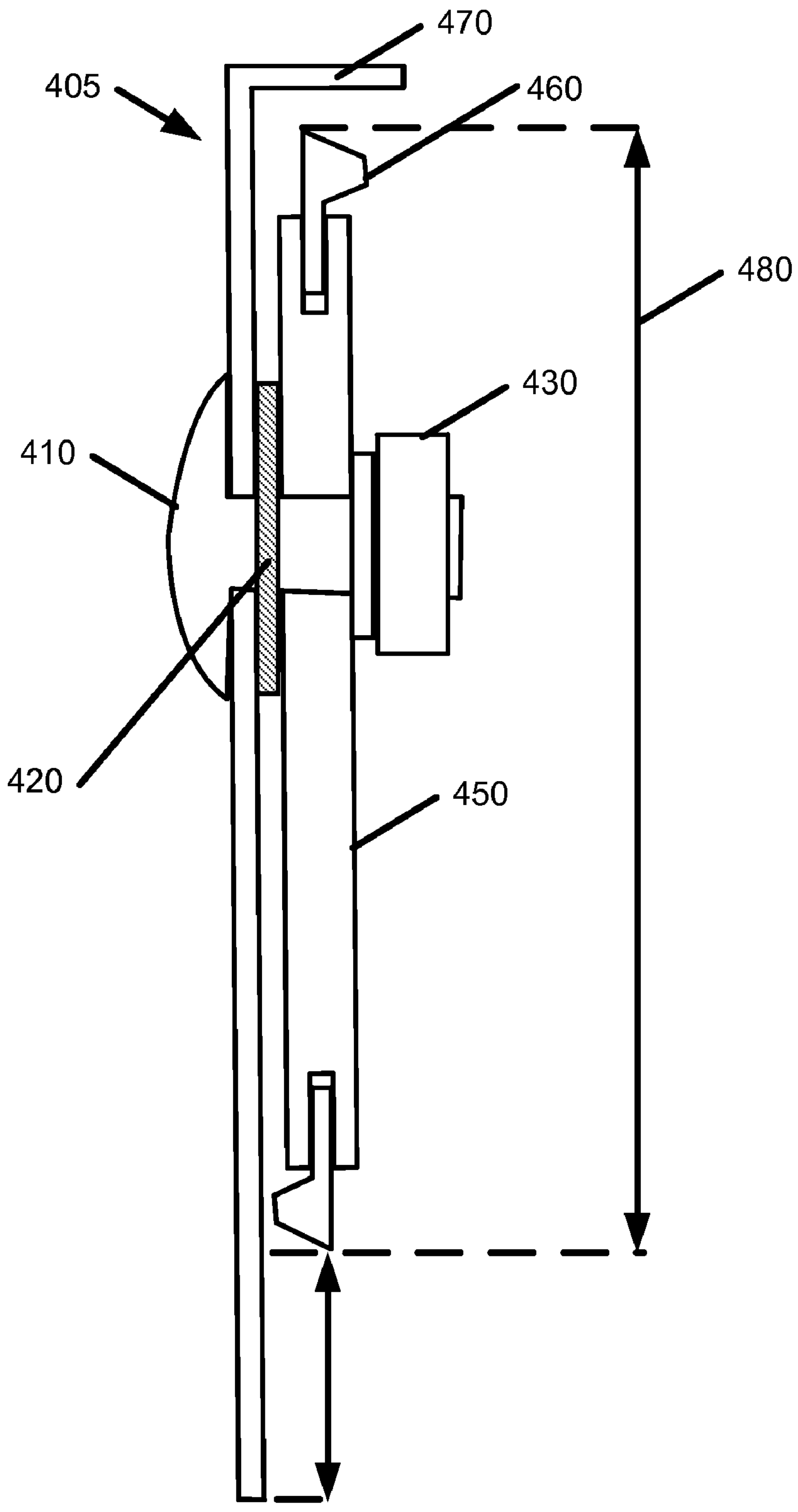
FIG. 4 provides a front view of the assembly securing the attachment to the chain saw bar in accordance with some embodiments of the invention.

FIG. 4 provides a front view of the assembly securing the attachment 405 to the chain saw bar 450 in accordance with some embodiments of the invention. As in FIG. 3, a bolt 410, washer 420, and nut 430 assembly secures the attachment 405 to the chain saw bar 450. The washer 420 acts as a spacer providing clearance along the horizontal axis of the figure. As noted in FIG. 3, clearance along the horizontal axis provides sufficient separation to allow for the cutting tooth 460 to flex as it circulates around the chain saw bar 450 without contacting the prongs of the attachment.

Clearance along the vertical axis is shown between the cutting tooth 460 of the blade and the cross-section member 470 of the attachment 405. The vertical clearance provides sufficient separation for the cutting tooth 460 to circulate underneath the cover of the cross-section member 470 without contacting the cross-section member 470. In some embodiments, the distance separating the cross-section member 470 from the cutting tooth 460 is at least 0.25 inches.

The positioning of attachment 405 relative to the chain saw bar 450 provides several advantages over other chain saw attachments. Specifically, by positioning the cross-section member 470 above the chain saw blade, the prongs extend the full length of the blade therefore allowing each prong to stabilize and facilitate the cutting of objects with diameters equal to the vertical distance 480 of the chain saw bar 450 in a single cut without obstruction by the cross-section member 470. The attachment 405 need not be removed or adjusted when alternating between cuts of objects one to four inches in diameter in between the prongs and cuts of larger objects using the front portion of the blade that the cross-section member does not cover (see 185 of FIG. 1). This also allows the chain saw to perform fully unobstructed cuts (e.g., cuts in an upward motion or kerf cuts) without adjusting or removing the attachment of some embodiments. The attachment 405 increases the safe operation of the chain saw because the cross-section member 470 covers the top portion of the blade nearest to the chain saw operator. The cover protects the chain saw operator from cut fragments that are dislodged upwards by the rotation of the cutting chain. Moreover, the prongs cover the lower portion of the blade and thus act to prevent the cutting teeth from contacting the ground or other hard surface.

Figure 5:
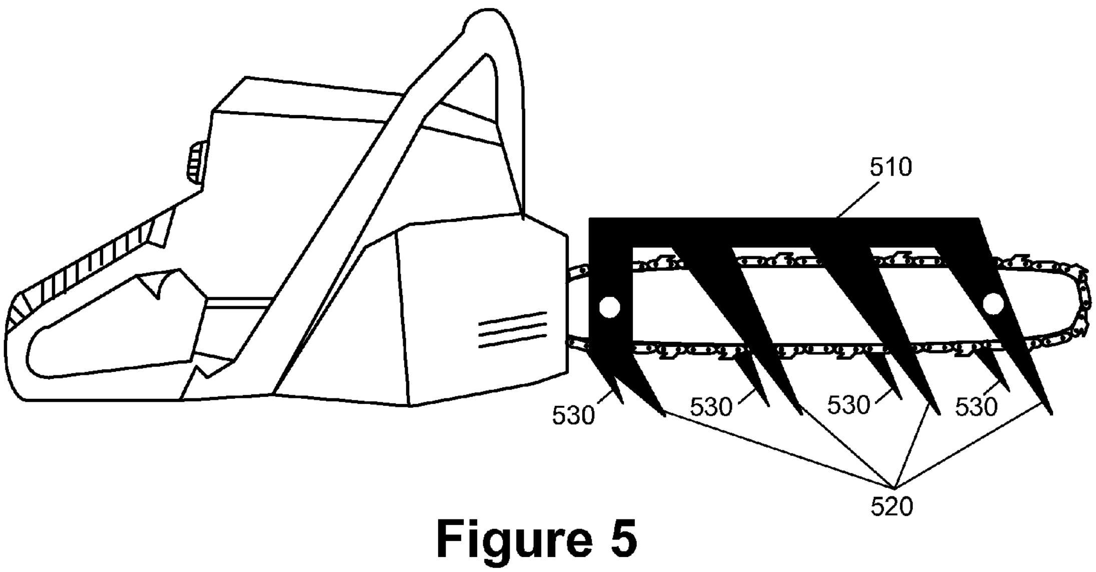
FIG. 5 illustrates the attachment with dual sets of prongs in accordance with some embodiments.

In some embodiments, the attachment includes prongs extending downwards from both sides of the attachment. FIG. 5 illustrates the attachment with dual sets of prongs 510 in accordance with some embodiments. As shown, the attachment 510 includes a first set of prongs 520 that extend over the right side of the chain saw blade and a second set of prongs 530 that extend over the left side of the chain saw blade. The first set of prongs 520 are aligned parallel to the second set of prongs 530.

The first set of prongs 520 work in conjunction with the second set of prongs 530 to align small objects (e.g., branches, twigs, etc.) perpendicularly relative to the cutting teeth of the blade. The extra set of prongs prevent small twigs from becoming lodged in between the blade and the attachment 510, because the extra set of prongs limits the angular or radial movement of the object engaged by the cutting teeth.

Figure 6:
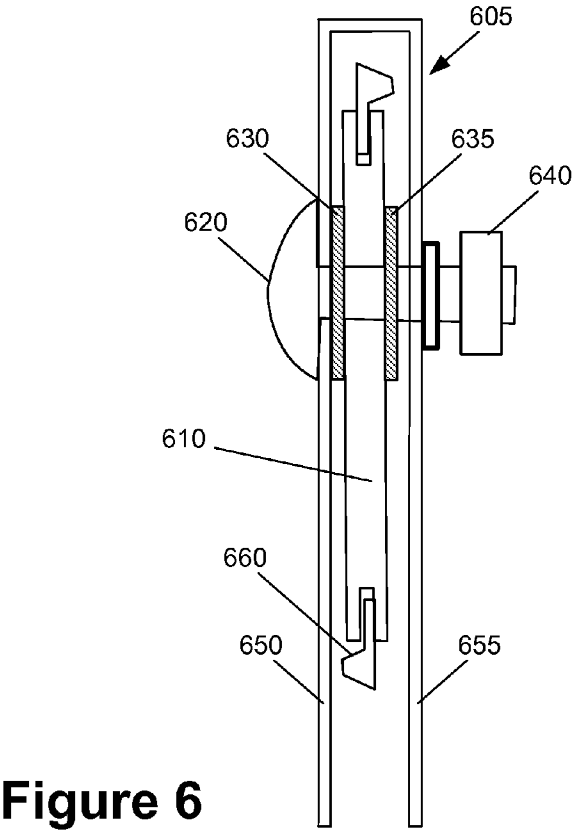
FIG. 6 provides a front view of the assembly securing the attachment with dual sets of prongs to the chain saw bar in accordance with some embodiments of the invention.

FIG. 6 provides a front view of the assembly securing the attachment with dual sets of prongs 605 to the chain saw bar 610 in accordance with some embodiments of the invention. A bolt 620, washer 630, washer 635, and nut 640 comprise the assembly that couples the attachment 605 to the chain saw bar 610. The bolt 620 passes through the right side of the attachment 605 (illustrated via prong 650), washer 630, the chain saw bar 610, washer 635, and the left side of the attachment 605 (illustrated via prong 655). The bolt 620 is secured by the nut 640 against the outer side of the left side of the attachment 605.

Washer 630 provides clearance between the cutting teeth of the blade 660 and prong 650 that extends vertically along the right side of the blade 660. Washer 635 provides clearance between the cutting teeth of the blade 660 and prong 655 that extends vertically along the left side of the blade 660.

It should be apparent to one of ordinary skill in the art that the attachment of some embodiments may be coupled to the chain saw bar using alternative coupling assemblies other than the bolt, washer, nut assembly of FIGS. 4 and 6. In some such embodiments, the connection points of the attachment may include clamping mechanisms on both sides of the attachment instead of the pass through holes 330 and 335 of FIG. 3. When the clamping mechanisms are tightened, the attachment 605 is secured to the chain saw bar by compression of the clamps to the chain saw bar. The force of the compression against the chain saw bar holds the attachment in place. Using such a coupling mechanism, the position of the attachment along the chain saw blade may be adjusted without having to align the connection points of the attachment 605 to the mounting points of the chain saw bar. Additionally, the attachment may be secured and unsecured to the chain saw bar without the use of tools.

In some embodiments, the attachment is used to cut brush into appropriately sized segments of biomass for conversion into biochar and other forms of charcoal (hereafter collectively referred to as biochar). Biochar is charcoal that is generated from the heating of organic matter. The process of creating biochar is known as pyrolysis. Biochar contains many of the same properties as traditional charcoal. For example, biochar may be used to generate heat. Producing biochar is also a form of carbon sequestration. Biochar is a solid whose composition contains large quantities of carbon. The biochar can be stored in the ground thereby trapping the carbon in the soil. Additionally, biochar contains many nutrients and aids in soil water retention. These properties make biochar a valuable fertilizer. Biochar also reduces waste as the resulting cut segments of brush can be used as a fuel source rather than be disposed of at a dump or landfill where it would otherwise biodegrade over time. Therefore, the attachment of some embodiments is used with a chain saw to cut brush and other organic small objects to appropriately sized segments for use as a fuel source or for conversion into biochar or other forms of charcoal.

A typical brush pile includes limbs, branches, sticks, etc. with diameters less than three inches and lengths greater than twelve inches. The attachment of some embodiments reduces the length of the objects in the pile quickly and safely into one to three inch segments through a series of cuts. Segments of this length are ideal for creating biochar. The prongs act as a guide in determining the length of the cut segments. The saw operator aligns the prongs of the attachment so that the brush extends one to three inches away from the blade of the chain saw and the prong. With a single downward motion, the attachment produces multiple cuts as the attachment contains multiple prongs, each prong engaging one or more objects for cutting. In this manner, the attachment of some embodiments quickly produces the biomass for conversion into biochar.

Figure 7:
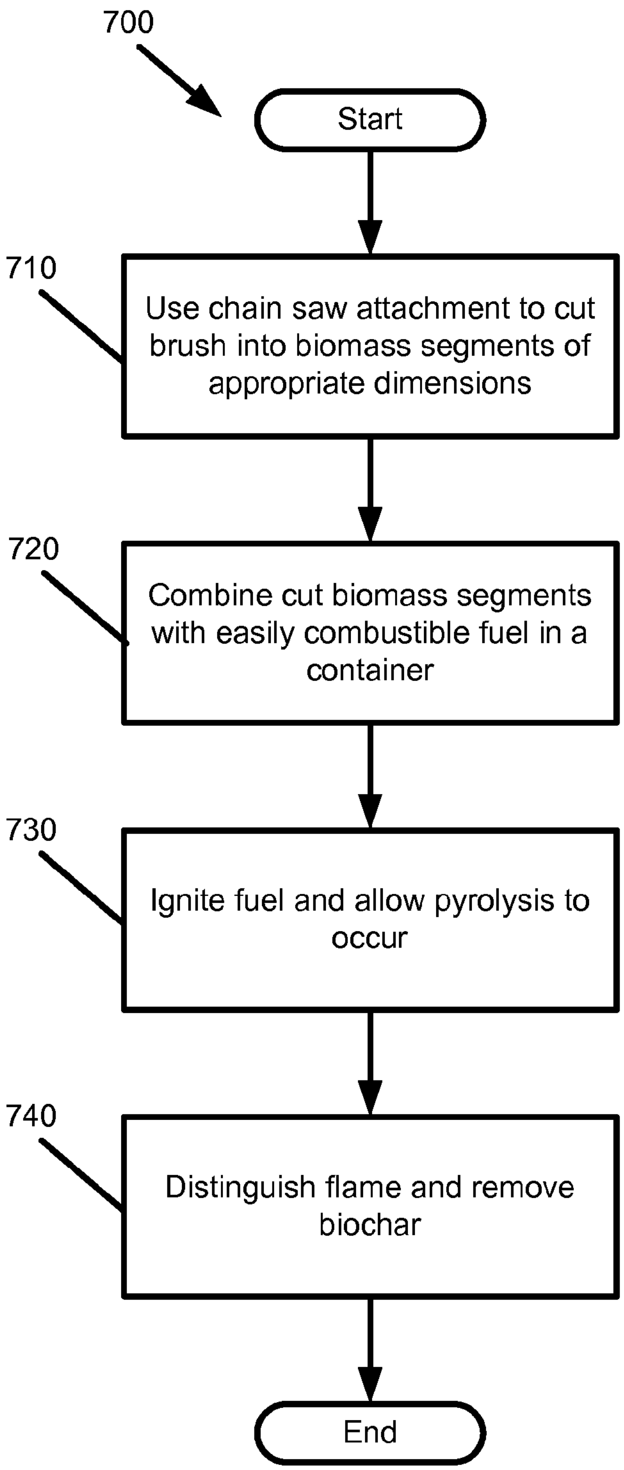
FIG. 7 presents a process for producing biochar in accordance with some embodiments of the invention.

FIG. 7 presents a process 700 for producing biochar in accordance with some embodiments of the invention. The process begins by using the attachment of some embodiments to cut (at 710) biomass segments of appropriate dimensions (e.g., one to three inch lengths) for conversion into biochar. The biomass segments are ignited at the top (at 720) with an easily combustible starter fuel source such as kerosene or alcohol in a cylindrical container. In some embodiment, the easily combustible fuel source is a set of tinder. The tinder includes twigs or branches that are smaller than the cut biomass segments from which the biochar is produced. The tinder is placed atop the biomass segments. It should be apparent to one of ordinary skill in the art that both tinder and liquid fuel may be used. The cylindrical container may include a small portable stove or charcoal lighter.

The biomass and combustible fuel is ignited and left to burn (at 730) in the cylindrical container. During this time, pyrolysis occurs converting the biomass into biochar. Pyrolysis may take thirty minutes to several hours to occur. The flame is then extinguished and the biochar is removed (at 740) from the cylindrical container and placed in an airtight metal container to cool.

Figure 8:
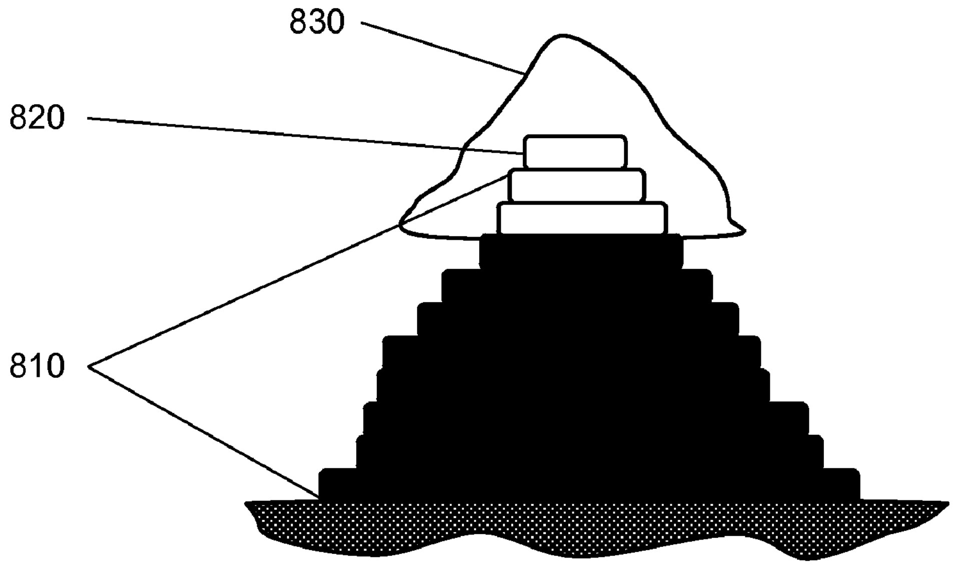
FIG. 8 conceptually illustrates a process in accordance with some embodiments that utilizes cut segments of biomass to produce biochar without need of a container.

It should be apparent to one of ordinary skill in the art that pyrolysis may occur using other components or procedures other than process 700. For example, FIG. 8 conceptually illustrates a process in accordance with some embodiments that utilizes cut segments of biomass to produce biochar without need of a container.

In this figure, sticks of biomass of various lengths are assembled in a pyramid 810. The top layer of the pyramid 820 is composed of any tinder including charcoal soaked in kerosene or alcohol. The top layer 820 is ignited with a match or torch. Once ignited, the volatiles in the top layer 820 burn. As one layer completes its burn, a layer of charcoal is produced and the flame ignites the next lower layer.

Combustion of the volatiles at a current burning layer removes the oxygen from the air rising from below. Without oxygen, the upper layers cease to combust and a protective atmosphere 830 is created which preserves the charcoal that has been produced in the upper layers. When the last layer is converted to charcoal, white ash becomes visible on the charcoal. The charcoal may then be used as a heat source. Alternatively, the pyramid of charcoal may be sprayed with water to stop further combustion leaving behind a tower of biomass that has been converted to charcoal.

Figure 9:
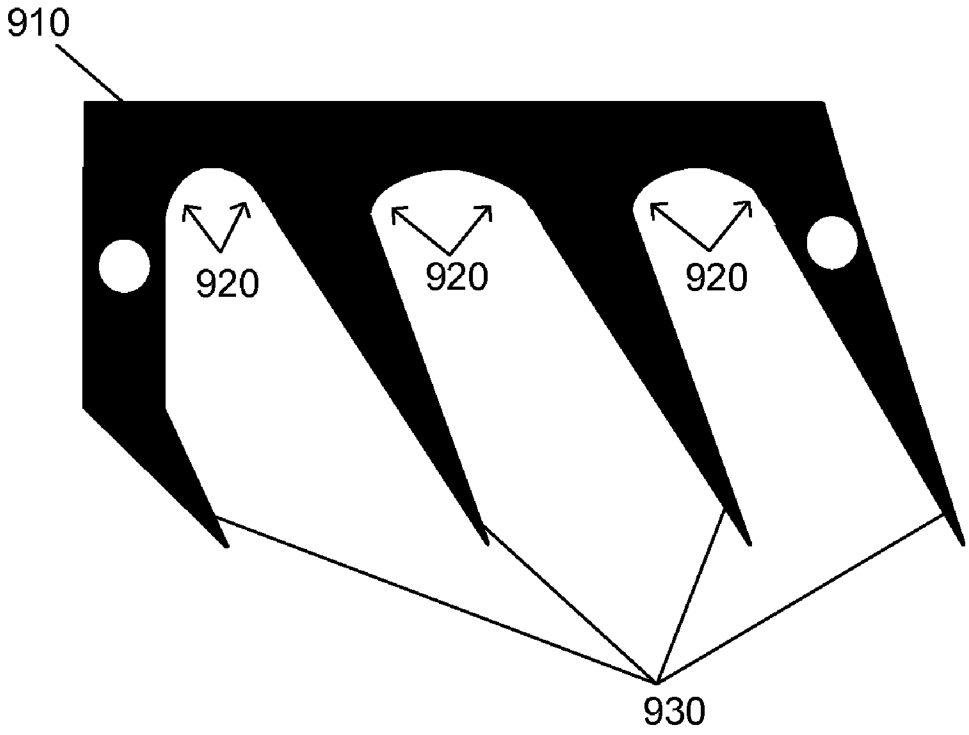
FIG. 9 illustrates the attachment of some embodiments modified with concave grooves to provide additional strength in the prongs.

While the invention has been described with reference to numerous specific details, one of ordinary skill in the art will recognize that the invention can be embodied in other specific forms without departing from the spirit of the invention. For instance, FIG. 9 illustrates the attachment 910 of some embodiments modified with concave grooves 920 to provide additional strength in the prongs 930. Thus, one of ordinary skill in the art would understand that the invention is not to be limited by the foregoing illustrative details, but rather is to be defined by the appended claims.

The invention claimed is:

1. A handheld portable chain saw comprising (i) a motor, (ii) a blade comprising a plurality of rotating cutting teeth, and (iii) an attachment, said attachment comprising:

an elongated cross-section member having a bottom surface and a top surface, the elongated cross-section member extending above the blade from a point adjacent to a proximal end of said blade to a point adjacent to a distal end of said blade wherein there is a vertical clearance between the bottom surface of the elongated cross-section member and the blade;

at least a first prong and a second prong that extend from the cross-section member downward at an angle away from the motor to a specified distance below said cutting teeth; and first and second connection points for coupling said attachment adjacent to said blade.

2. The attachment of claim 1, wherein said angle is 10-40 degrees.

3. The attachment of claim 1, wherein at least one of the first and second prongs in conjunction with rotation of the cutting teeth produces a self-feeding action that forces an object upwards along said angle of the at least first and second prong into the cutting teeth.

4. The attachment of claim 1, wherein the first prong is separated from the second prong by a distance equivalent to at least a vertical distance between top and bottom of the blade such that an object with a diameter equal to said vertical distance can be placed in between said first and second prongs for cutting by the rotating cutting teeth using a single continuous downward motion of the chain saw.

5. The attachment of claim 4, wherein said vertical distance comprises a range of 2-4 inches.

6. The attachment of claim 1, wherein said first prong limits movement of an object engaged by said cutting teeth to stabilize said object for cutting by the cutting teeth.

7. The attachment of claim 6, wherein said movement is restricted to a distance separating the first prong from the second prong.

8. The attachment of claim 1, wherein the point adjacent to a distal end of said blade is particular distance from the distal end of the blade to allow for at least one of upward cutting motions and kerf cuts using the particular distance from the distal end of the blade.

9. The attachment of claim 1, wherein the specified distance of the extension of the first and second prongs below the cutting teeth provides a stop for performing cuts down to a surface.

10. The attachment of claim 1, wherein said cross section member distributes stress from each of the first and second prongs across the attachment.

11. The attachment of claim 1, wherein the chain saw comprises at least one of a gasoline powered chain saw and an electric powered chain saw.

12. The attachment of claim 1, wherein said bottom surface of the elongated cross-section member extends above a top row of the plurality of rotating cutting teeth with sufficient vertical clearance to allow rotation of the top row of the plurality of rotating cutting teeth below the bottom surface without contact.

* * * * *